(12) United States Patent
Nakahara

(10) Patent No.: US 7,912,221 B2
(45) Date of Patent: Mar. 22, 2011

(54) COMMUNICATION APPARATUS AND METHOD THEREOF

(75) Inventor: Masanori Nakahara, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 956 days.

(21) Appl. No.: 11/760,099

(22) Filed: Jun. 8, 2007

(65) Prior Publication Data

US 2008/0019520 A1    Jan. 24, 2008

(30) Foreign Application Priority Data

Jun. 12, 2006 (JP) ................................. 2006-162812

(51) Int. Cl.
*H04K 1/00* (2006.01)
(52) U.S. Cl. ........... 380/247; 380/45; 713/163; 713/171
(58) Field of Classification Search .................... 380/45, 380/283, 247; 713/163, 171
See application file for complete search history.

(56) References Cited

U.S. PATENT DOCUMENTS

| | | | | |
|---|---|---|---|---|
| 7,069,436 B1 * | 6/2006 | Akachi | ........................ | 713/162 |
| 2004/0005058 A1 | 1/2004 | Jang et al. | | |
| 2005/0123141 A1 * | 6/2005 | Suzuki | ......................... | 380/277 |
| 2005/0215234 A1 | 9/2005 | Fukuzawa et al. | | |

FOREIGN PATENT DOCUMENTS

| | | |
|---|---|---|
| JP | 2004-260556 A | 9/2004 |
| JP | 2005-278044 A | 10/2005 |
| KR | 2005-0066636 A | 6/2005 |

OTHER PUBLICATIONS

Altunbasak H. et al, Alternative Pair-wise Key Exchange Protocols for Robust Security Networks in Wireless LANs, IEEE 802.11i, 2004, Southeastcon 2004. Proceedings IEEE Greensboro, North Carolina, USA, Piscataway, NJ, USA, IEEE, pp. 77-83, XP010697814.

* cited by examiner

*Primary Examiner* — Matthew B Smithers
*Assistant Examiner* — Paul Callahan
(74) *Attorney, Agent, or Firm* — Canon U.S.A., Inc. I.P. Division

(57) ABSTRACT

This invention enhances the security strength of wireless communications in the ad-hoc mode. To this end, it is checked if the communication apparatus and a terminal of a communication partner can concurrently use different encryption keys in correspondence with a plurality of communication destinations. When at least one of the communication apparatus and the terminal of the communication partner cannot concurrently use different encryption keys in correspondence with the plurality of communication destinations, an encryption key uniquely set in the wireless network is set as an encryption key for a communication with the terminal of the communication partner.

6 Claims, 14 Drawing Sheets

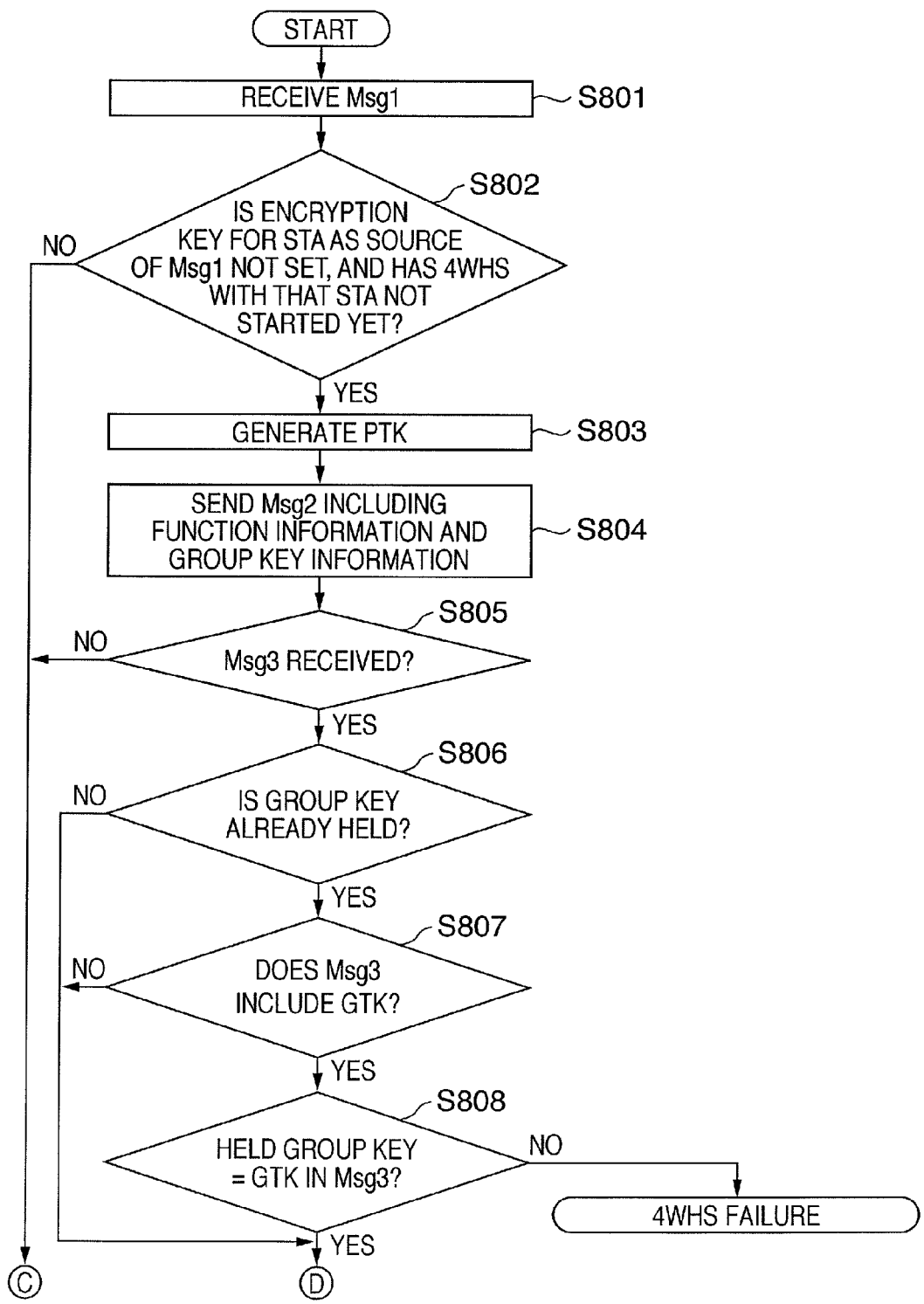

COMMUNICATION APPARATUS AND METHOD THEREOF

BACKGROUND OF THE INVENTION

1. Field of the Invention

The present invention relates to a communication apparatus which is connected to a wireless network and directly communicates with another terminal.

2. Description of the Related Art

Communication data is encrypted to prevent eavesdropping and alteration. Especially, since wireless communications readily suffer eavesdropping, it is important to ensure a secure communication path.

In an infrastructure mode of a wireless network, a communication terminal (STA) and access point (AP) implement standards such as wired equivalent privacy (WEP) or Wi-Fi protected access (WPA) WEP guarantees security by setting an encryption key in the STA and AP in advance and using that key in a communication. However, in this scheme, the encryption key is always fixed, and the encryption level (the strength of an encryption algorithm) adopted by WEP is not so high. Hence, various situations that cannot guarantee security exist. WPA, which is laid down to solve such problems, enhances the encryption level and improves security by generating an encryption key every time the STA joins the network, based on information set in advance in the STA and AP.

In the infrastructure mode, the STA sends data to another STA via the AP. In other words, since the STA directly communicates with only the AP, security can be assured only for a communication with the AP.

On the other hand, in an ad-hoc mode of the wireless network, there is no AP, and the STA directly communicates with a communication partner. Therefore, upon communicating with a plurality of STAs, the security of communications with these STAs must be considered. In order to ensure security in the ad-hoc mode as in the infrastructure mode, it is desirable to change an encryption key for each communication session. Upon making communications using commercially available wireless network devices in the ad-hoc mode, the same encryption key is set in advance in all STAs which join the network, and that encryption key is used. For this reason, the problem of security in the infrastructure mode remains unsolved.

To solve these problems, IEEE802.11i, which was standardized after WPA, proposes dynamic generation of an encryption key for each communication session even in the ad-hoc mode. FIG. 1 is a sequence chart showing the method of generating an encryption key in IEEE802.11i.

Communication terminals STA1 and STA2 perform a message exchange called a four-way handshake, and generate and share a unicast key PTK (pairwise transient key) and group key GTK (group temporal key). In steps S401 to S404, the STA1 and STA2 exchange random numbers (A Nonce and S Nonce) as an EAPOL-key to generate and share PTK12 and GTK1 that the STA1 uses in transmission. In step S405 to S409, the STA1 and STA2 exchange random numbers to generate and share PTK21 and GTK2 that the STA2 uses in transmission. Note that EAPOL is a short for an extensible authentication protocol.

Upon further communicating with STA3, the STA1 similarly performs the four-way handshake (S410, S411), and generates and shares a PTK and GTK with the STA3.

A feature of this scheme lies in that a communication is made by switching an encryption key for each communication partner, and different keys are set for transmission and reception. One group key for transmission is determined so that all the STAs can receive, and each STA has a group key for reception.

In consideration of existing wireless network devices, not all devices can set an encryption key for each communication partner. In other words, some devices can only set an identical encryption key for all communication partners. If the number of encryption keys is limited to one, the device arrangement can be simplified to reduce cost. However, such limitation on the encryption key makes it hard to implement the specification of IEEE802.11i. For example, a wireless network device used as the AP meets the specification of IEEE802.11i, but its cost is approximately 1.5 times that of a wireless network device used as the STA.

In this way, the conventional ad-hoc mode communication cannot implement switching of an encryption key for each communication session. IEEE802.11i is an ideal scheme in terms of security. However, the encryption key generation method of IEEE802.11i is complicated, and some wireless network devices do not meet the specification of IEEE802.11i. Therefore, to enhance the security strength of wireless communications in an ad-hoc mode, the present invention provides an algorithm in which if a wireless network device comprises a function of changing an encryption key for each STA, the algorithm works accordingly; if a device cannot change an encryption key for each STA, that algorithm changes an encryption key every time a key communication session is established.

SUMMARY OF THE INVENTION

In one aspect, a communication apparatus connected to a wireless network for directly communicating with another terminal determines if the communication apparatus and a terminal of a communication partner can concurrently use different encryption keys in correspondence with a plurality of communication destinations, and sets an encryption key uniquely set in the wireless network as an encryption key for a communication with the terminal of the communication partner when at least one of the communication apparatus and the terminal of the communication partner cannot concurrently use different encryption keys in correspondence with the plurality of communication destinations.

According to the aspect, the security strength of a wireless communication in the ad-hoc mode can be improved.

Further features of the present invention will become apparent from the following description of exemplary embodiments with reference to the attached drawings.

BRIEF DESCRIPTION OF THE DRAWINGS

FIGS. 11A to 12B are flowcharts showing processing that implements the sequences shown in FIGS. 8 to 10.

DESCRIPTION OF THE EMBODIMENTS

Information processing according to one embodiment of the present invention will be described in detail hereinafter with reference to the accompanying drawings.

[Wireless Communication System]

Figure 1:
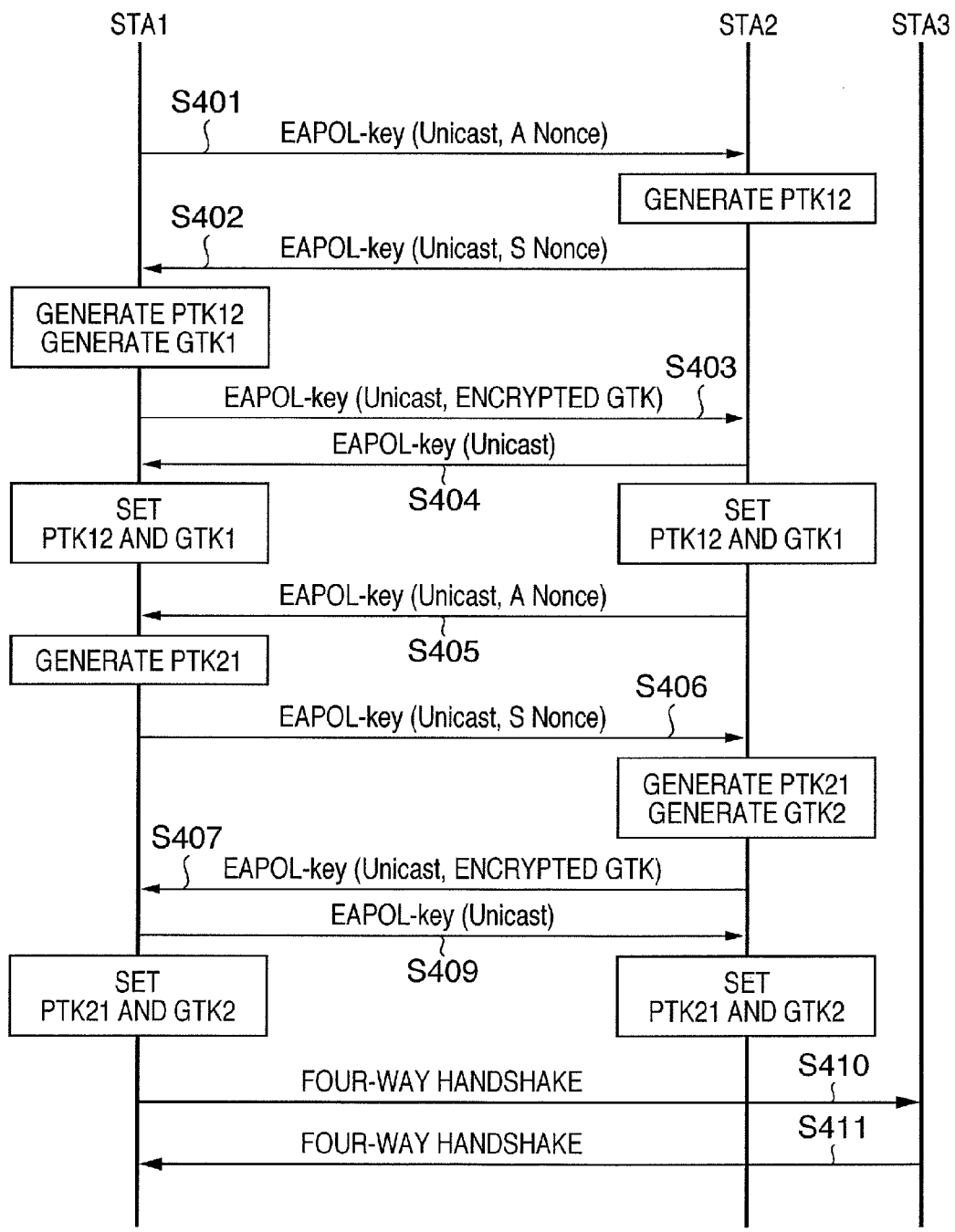
FIG. 1 is a sequence chart showing the method of generating an encryption key in IEEE802.11i.
Figure 2:
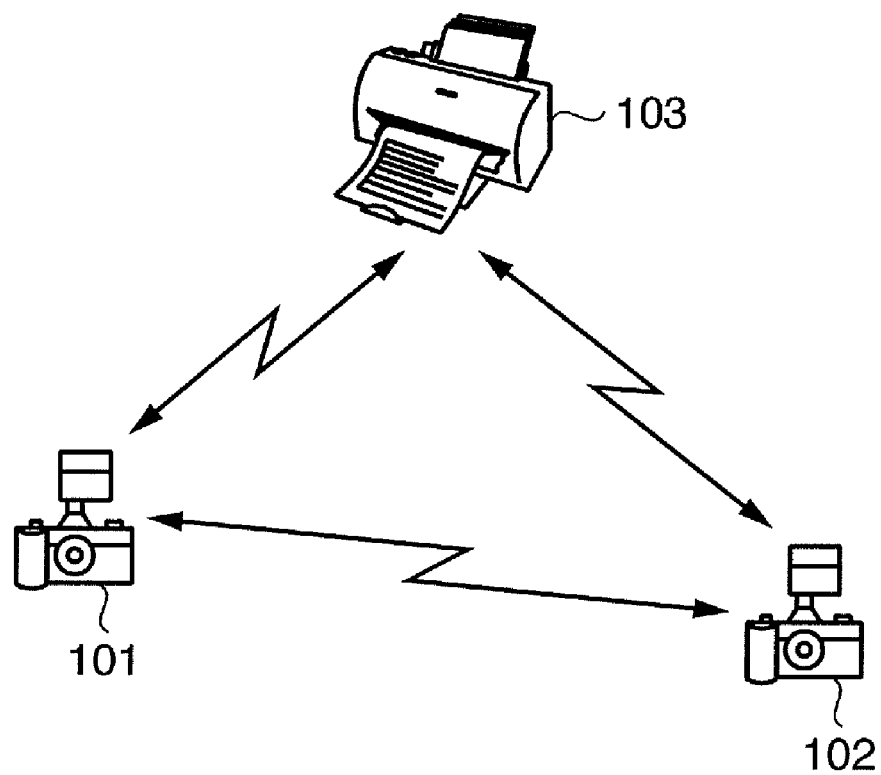
FIG. 2 is a view showing the arrangement of a wireless communication system which makes data transmission using a wireless communication.

FIG. 2 is a view showing the arrangement of a wireless communication system that makes data transmission using a wireless communication.

Digital cameras (to be referred to as "cameras" hereinafter) 101 and 102 comprise a wireless communication function, and make data transmission between them or with a printer 103. A mode that allows STAs to directly communicate with each other without going through any AP is the ad-hoc mode.

[Camera]

Figure 3:
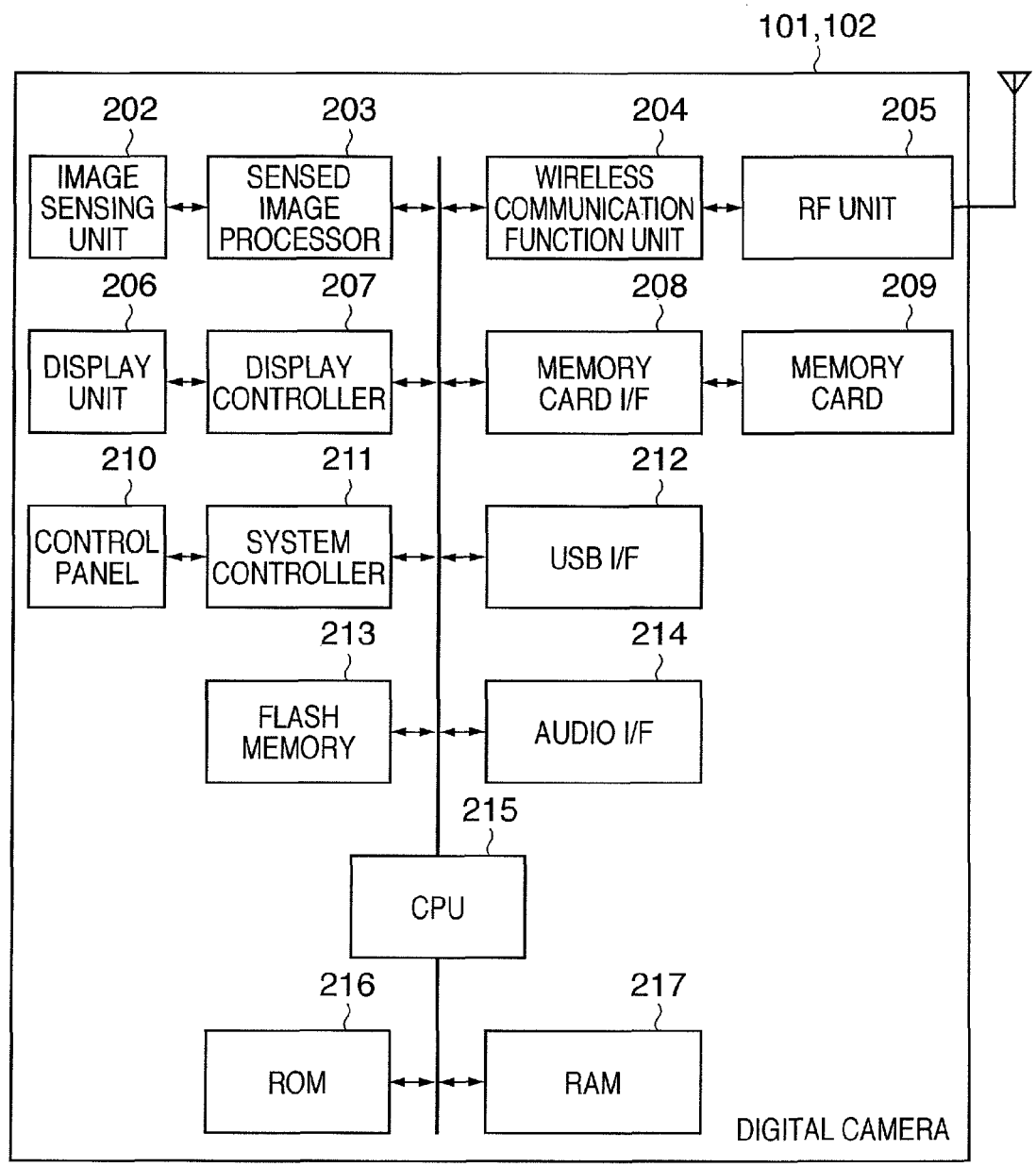
FIG. 3 is a block diagram showing the functional arrangement of a camera.

FIG. 3 is a block diagram showing the functional arrangement of the cameras 101 and 102, which are assumed to have the same functions.

A control panel 210 connected to a CPU 215 via a system controller 211 comprises a shutter switch and various keys. An image sensing unit 202 senses an image of an object upon pressing of the shutter switch. A sensed image processor 203 processes an image sensed by the image sensing unit 202. A display controller 207 controls the contents to be displayed on a display unit 206, which displays information for the user by means of LCD display, LED indications, and the like. (Note that information may be notified by sound.) Note that a user operation for, e.g., selecting information displayed on the display unit 206 is made in cooperation with the control panel 210. That is, the display unit 206 and control panel 210 form a user interface.

A memory card 209 is connected to a memory card interface (I/F) 208. A USB (universal serial bus) interface (I/F) 212 provides a serial bus interface used to connect an external device. An audio I/F 214 is an interface used to exchange an audio signal with an external device.

A wireless communication function unit 204 makes a wireless communication. A radio frequency (RF) unit 205 exchanges a radio signal with another wireless communication device. Note that the RF unit 205 and wireless communication function unit 204 may sometimes be implemented as one functional block. The wireless communication function unit 204 executes packet framing, a response to data, data encryption/decryption processing, and the like based on the radio standard.

The CPU 215 executes programs stored in a ROM 216 or flash memory 213 using a RAM 217 or the flash memory 213 as a work memory to control the aforementioned components. A program which launches the wireless communication function unit 204 and RF unit 205 is normally stored in the ROM 216. The flash memory 213 is a non-volatile memory, and stores setting information of a wireless communication and the like.

[Printer]

Figure 4:
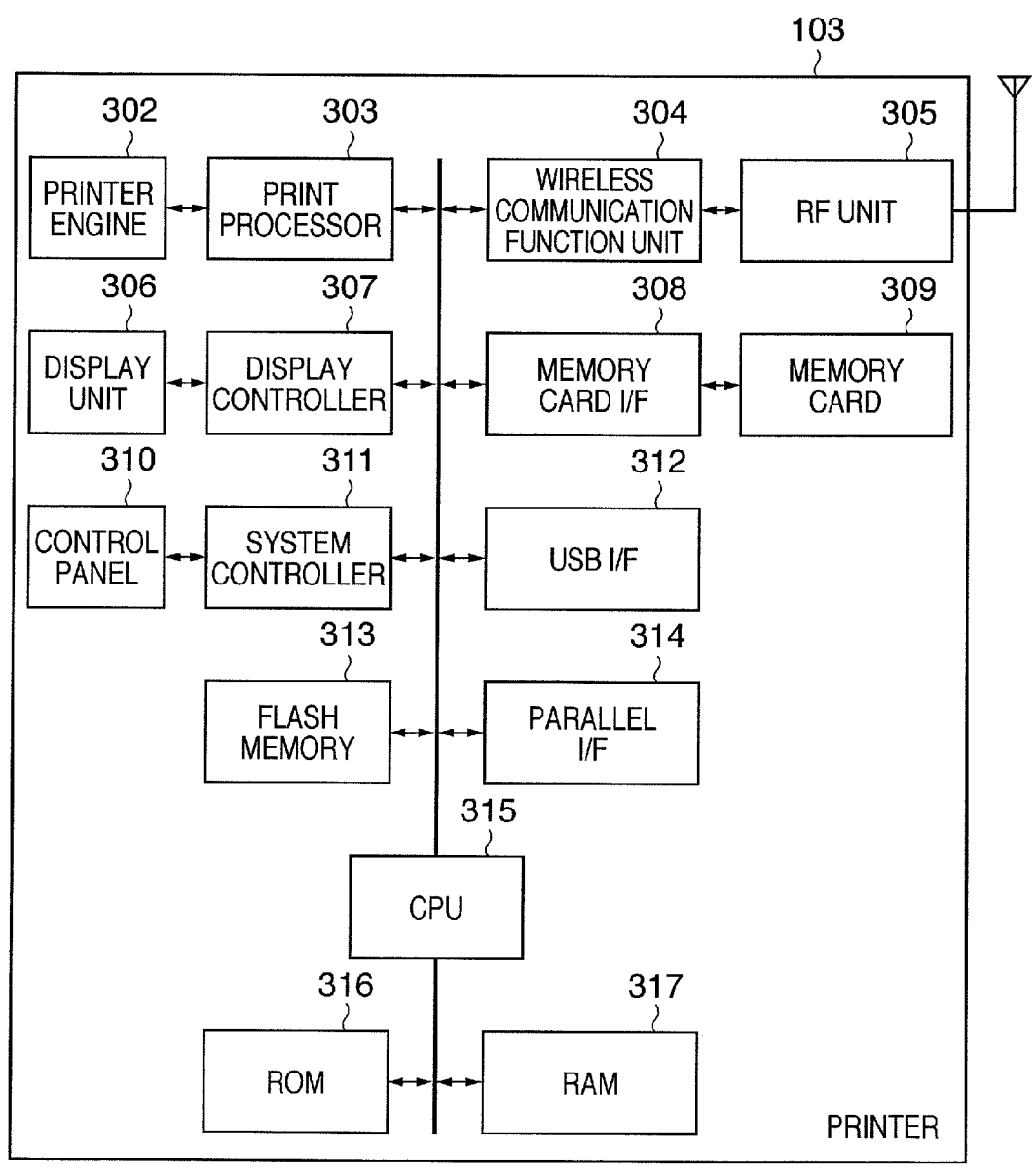
FIG. 4 is a block diagram showing the functional arrangement of a printer.

FIG. 4 is a block diagram showing the functional arrangement of the printer 103.

A control panel 310, which is connected to a CPU 315 via a system controller 311, comprises various keys. A printer engine 302 prints an image on a print sheet based on an image signal output from a print processor 303. A display controller 307 controls the contents to be displayed on a display unit 306, which displays information for the user by means of LCD display, LED indications, and the like. (Note that information may be notified by means of audio.) Note that a user operation for, e.g., selecting information displayed on the display unit 306 is made in cooperation with the control panel 310. That is, the display unit 306 and control panel 310 form a user interface.

A memory card 309 is connected to a memory card I/F 308. A USB I/F 312 provides a serial bus interface used to connect an external device. A parallel I/F 314 provides a parallel interface used to connect an external device.

A wireless communication function unit 304 makes a wireless communication. A radio frequency (RF) unit 305 exchanges a radio signal with another wireless communication device. Note that the RF unit 305 and wireless communication function unit 304 may sometimes be implemented as one functional block. The wireless communication function unit 304 executes packet framing, a response to data, data encryption/decryption processing, and the like based on the radio standard.

The CPU 315 executes programs stored in a ROM 316 or flash memory 313 using a RAM 317 or the flash memory 313 as a work memory to control the aforementioned components. A program which launches the wireless communication function unit 304 and RF unit 305 is normally stored in the ROM 316. The flash memory 313 is a non-volatile memory, and stores setting information of a wireless communication and the like.

[Communication Function Unit]

Whether or not an encryption key can be changed for each STA as a communication partner depends on the functions of the wireless communication function units 204 and 304. Some communication function units can set different encryption keys for respective destination addresses (IP (Internet protocol) addresses, MAC (media access control) addresses, and the like), some other units can set different encryption keys for transmission and reception, some other units can only set an identical encryption key for all the destination addresses, and so forth. In this embodiment, it is assumed that the cameras 101 and 102 and the printer 103 can set an identical unicast key for transmission and reception in correspondence with each destination address. However, it is assumed that the cameras and printer have a capability of holding only one group key in a network to which they join.

The functional arrangements of the cameras 101 and 102 and the printer 103 in this embodiment have been explained. Note that the RF unit 205 or 305 comprises an antenna, which does not always protrude from the device. Especially in the case of a digital camera, since portability is an important factor, the antenna is desirably incorporated or implemented on the device surface without protruding from the device.

[Sharing Method of Encryption Key in WPA]

Prior to a description of a sharing algorithm of an encryption key in the cameras 101 and 102 and the printer 103, a sharing method of an encryption key used in WPA will be described below. The present invention can generate an encryption key for each session in both the cases wherein an encryption key can be changed for each destination address and wherein it cannot be changed, by improving the WPA algorithm.

Figure 5:
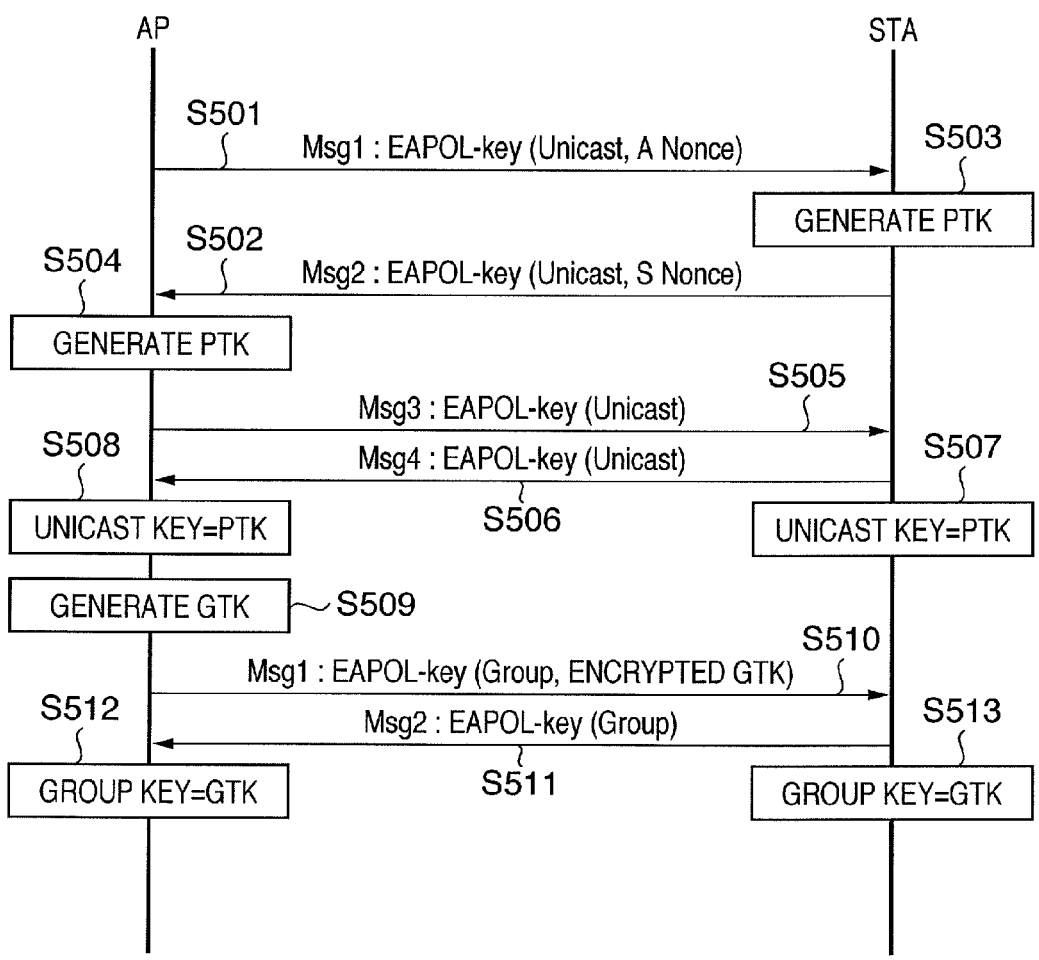
FIG. 5 is a sequence chart for explaining the sharing method of a unicast key and a group key between the AP and STA in the infrastructure mode.

FIG. 5 is a sequence chart for explaining the sharing method of a unicast key and a group key in an AP and STA in the infrastructure mode.

When the STA is connected to the network and establishes a session with the AP, a four-way handshake starts. The AP sends a message Msg1 to the STA (S501). The Msg1 includes information (Unicast) indicating a message required to exchange a unicast key, and a random number (A Nonce) generated by the AP. Note that a frame of the message is compliant to the EAPOL format.

Upon reception of the Msg1, the STA generates a random number (S Nonce) different from the A Nonce, and sends it to the AP as Msg2 (S502). A PTK can be generated based on the A Nonce and S Nonce, and information held in advance by the STA and AP. Hence, the AP and STA generates a PTK (S503, S504).

The AP sends Msg3 indicating correct generation of the PTK to the STA (S505). Likewise, the STA sends Msg4 indicating correct generation of the PTK to the AP (S506). The AP and STA set the PTK as a unicast key (S507, S508) and, after that, they execute encrypted data transfer between them in association with unicast. In this way, the unicast key is generated when the AP and STA exchange information elements such as random numbers and the like, and an encryption key itself is not transferred.

The sharing method of a group key will be described below. Upon completion of the four-way handshake (S501 to S506), the AP generates a GTK (S509). If the GTK already exists, the AP may use it. Subsequently, the AP sends a group-key handshake message Msg1 to the STA (S510). The Msg1 includes information (Group) indicating a message required to exchange a group key, and the GTK encrypted by the unicast key. Note that a frame of the message is compliant to the EAPOL format.

Upon reception of the Msg1, the STA sends Msg2 as a reception confirmation message to the AP (S511). The AP and STA set the GTK as a group key (S512, S513) and then encrypt broadcast packets using the group key.

[Expansion of Four-way Handshake]

Figure 6:
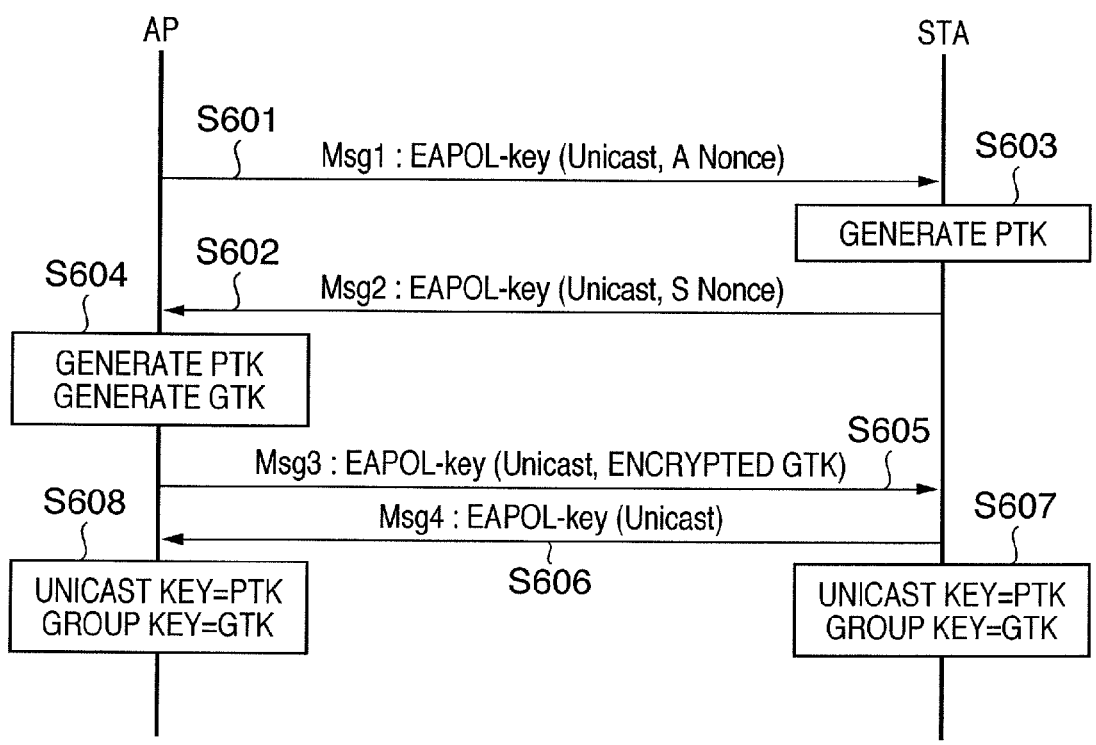
FIG. 6 is a chart for explaining expansion of a four-way handshake specified in IEEE802.11i.

FIG. 6 is a chart for explaining expansion of the four-way handshake specified in IEEE802.11i. IEEE802.11i expands to allow exchange of a GTK in the four-way handshake. The same steps (S601 to S603) as steps S501 to S503 in FIG. 5 are executed until the AP and STA exchange the Msg2. The AP generates a GTK together with the PTK (S604), and appends the GTK encrypted by PTK to Msg3 (S605). The STA sends Msg4 indicating correct generation of the PTK to the AP (S606). In this way, the sequence is devised to obviate the need for a group-key handshake. Upon reception of the Msg3, the STA can decrypt the GTK since it has already generated the PTK in step S603. Therefore, the AP and STA set the PTK as a unicast key, and GTK as a group key (S607, S608).

[Encryption Key Generation for Each Communication Session]

There are two large differences between the infrastructure mode and ad-hoc mode. As the first difference, it is specified in the infrastructure mode that the Msg1 of the four-way handshake is sent from the AP. On the other hand, in the ad-hoc mode, since STAs directly communicate with each other, either STA may send the Msg1 first. This embodiment has no particular specification in this respect, and a STA which sends the Msg1 first starts the four-way handshake.

As the second difference, in the ad-hoc mode, since STAs directly transmit data, it is necessary to determine whether to use different encryption keys for respective STAs or an identical encryption key for all the STAs. In order to prevent breakage of an encryption key, it is desirable to set an encryption key for each session. When an identical encryption key is used for all the STAs, its sharing method poses a problem. In order to change an encryption key for each communication partner, key management processing of the communication function unit is required, thus requiring processing overhead and management cost. For these reasons, most wireless network devices are designed to have only one unicast key for a destination under the present circumstances.

This embodiment allows an encryption key to be changed every time a communication session is established. Furthermore, when a STA comprises a function capable of changing an encryption key for each destination, different encryption keys are used; when a STA does not comprise a function capable of changing an encryption key for each destination, an identical encryption key is used for all the STAs. In this way, a STA having advanced functions can enjoy the benefit of that function, and a STA which does not have such functions can assure minimum required security.

In order to implement the above function, communication terminals exchange the following two pieces of information.

(A) Function information: TYPE1 when a STA has the function capable of changing an encryption key for each destination; otherwise, TYPE2.

(B) Group key information: GkeyExist when a STA already holds a group key; otherwise, GkeyNotExist.

Figure 7:
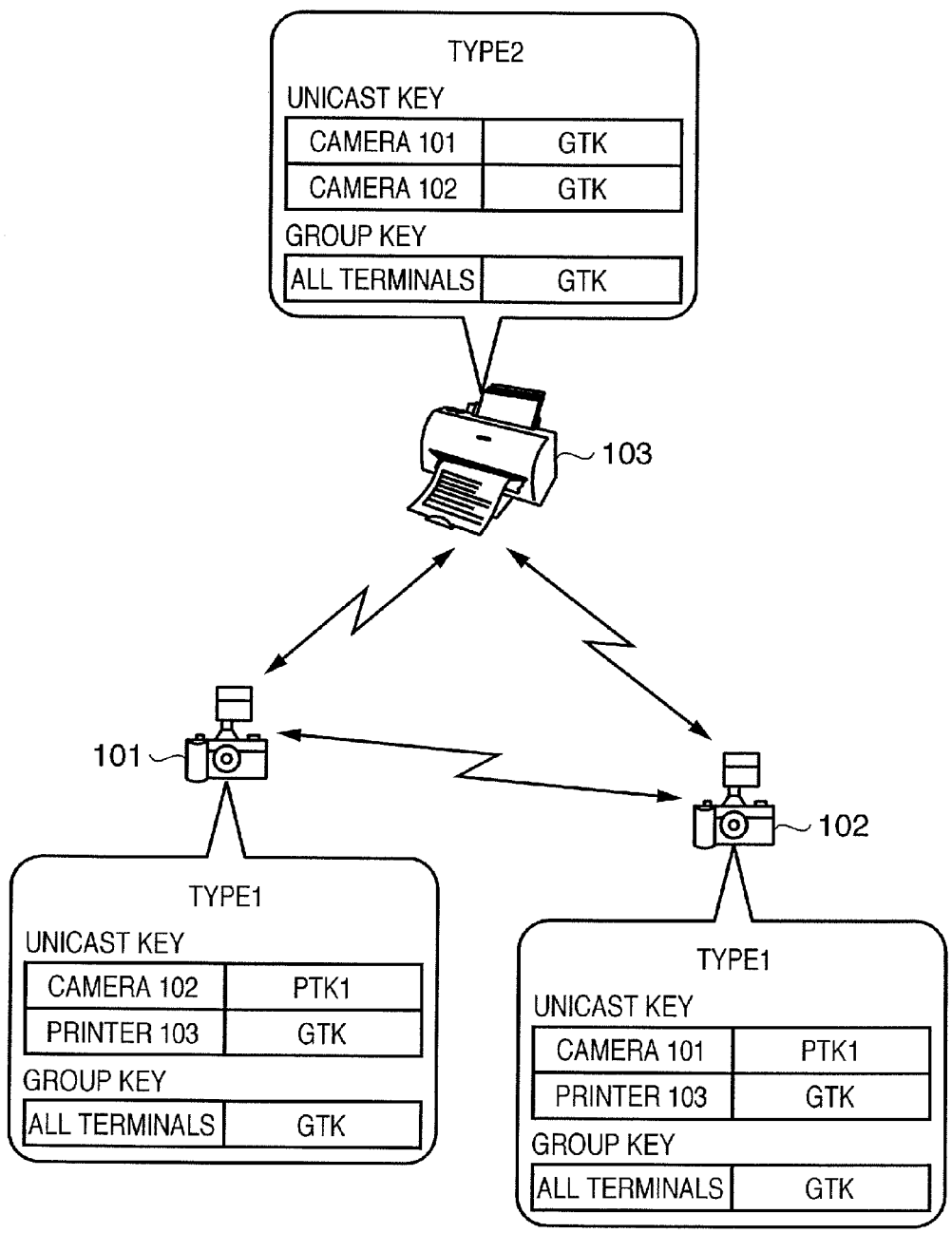
FIG. 7 shows unicast keys and group key set when cameras and a printer start to communicate with each other.

Exchanging the above information in the aforementioned four-way handshake allows an encryption key to be shared, as shown in FIG. 7.

Since the cameras 101 and 102 belong to TYPE1, the security of a unicast communication between them is protected by unicast key PTK1 unique to these two STAs. The printer 103 which belongs to TYPE2 communicates with the cameras 101 and 102 using an identical unicast key. The printer 103 uses a group key GTK as the unicast key between the cameras 101 and 102. Note that the printer 103 uses the same key for the two destinations, but can use a different group key GTK every time it joins the network and establishes a session. Therefore, it is harder to break an encryption key than WEP.

Camera to Camera

Figure 8:
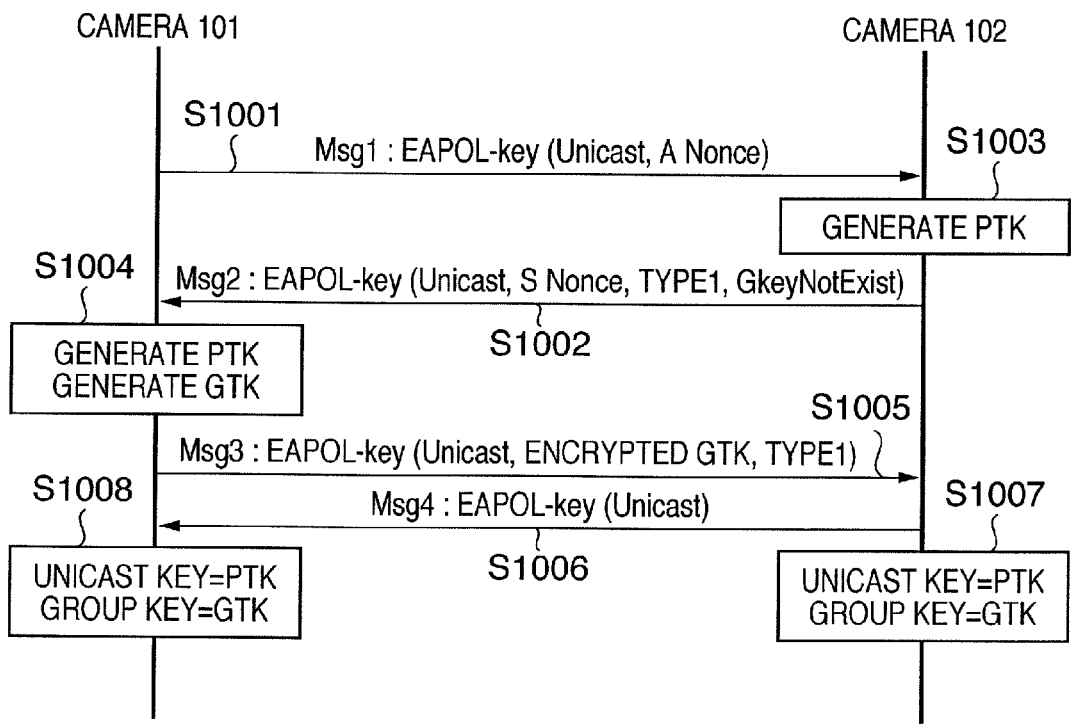
FIG. 8 is a sequence chart for explaining generation of an encryption key upon starting a communication session between cameras.

FIG. 8 is a sequence chart for explaining generation of an encryption key upon starting a communication session between the cameras 101 and 102. This sequence is nearly the same as the aforementioned four-way handshake, except that the function information and group key information are exchanged.

The camera 101 sends Msg1 to the camera 102 (S1001). The frame of the Msg1 includes a random number (A Nonce) generated by the camera 101. Upon reception of the Msg1, the camera 102 sends, to the camera 101, Msg2 which includes a random number (S Nonce) different from that of the camera 101, TYPE1 as the function information, and GkeyNotExist indicating that a group key is not held as the group key information (S1002). Note that the storage locations of these pieces of information in the Msg2 are not particularly limited. However, it is desirable to store them in a Robust Security Network (RSN) information element whose self-expansion is allowed.

The cameras 101 and 102 generate a PTK based on the A Nonce and S Nonce, and information held in advance by them (S1003, S1004). Furthermore, the camera 101 detects based on GkeyNotExist appended to the Msg2 that the camera 102 does not hold any group key, and generates a GTK (S1004). The camera 101 sends, to the camera 102, Msg3 which includes the GTK encrypted by the PTK and TYPE1 as the function information (S1005). Upon reception of the Msg3, the camera 102 decrypts the GTK encrypted using the PTK, and sends Msg4 as a confirmation response to the camera 101 (S1006).

If the cameras 101 and 102 detect based on the exchanged function information that each other's partners have the TYPE1 function, they set the PTK as a unicast key and the GTK as a group key (S1007, 1008).

Camera to Printer

Figure 9:
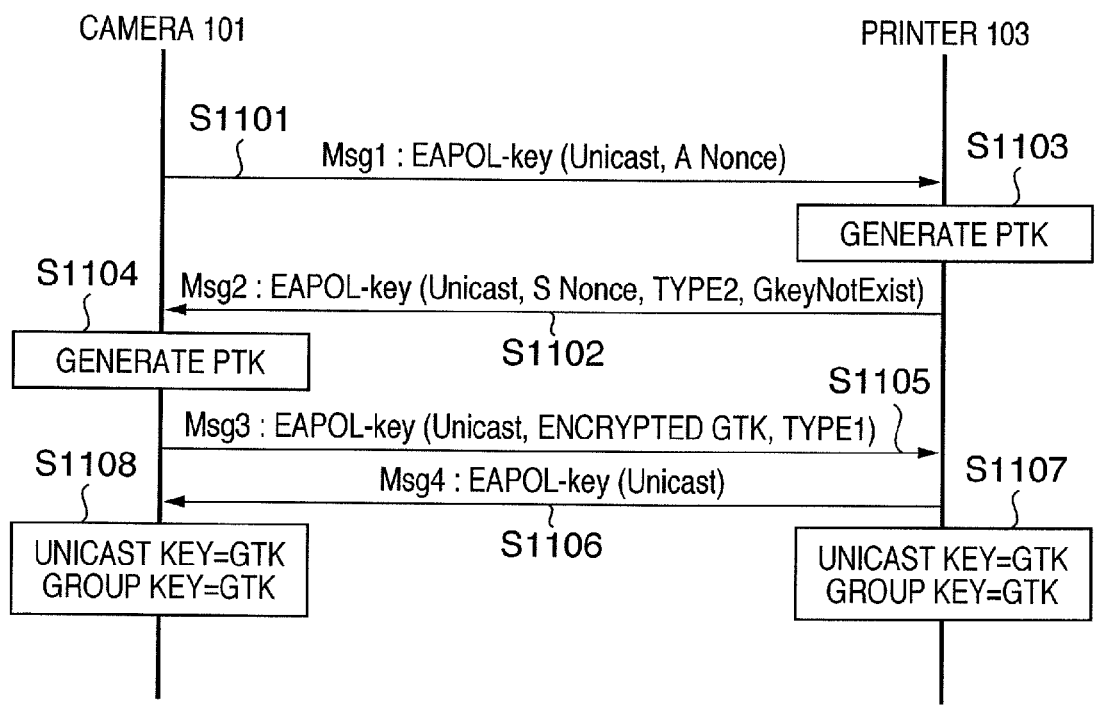
FIGS. 9 and 10 are sequence charts for explaining generation of an encryption key upon starting a communication session between a camera and a printer.

FIG. 9 is a sequence chart for explaining generation of an encryption key upon starting a communication session between the camera 101 and printer 103.

The camera 101 sends Msg1 to the printer 103 (S1101). The frame of the Msg1 includes a random number (A Nonce) generated by the camera 101. Upon reception of the Msg1, the printer 103 sends, to the camera 101, Msg2 which includes a random number (S Nonce) different from that of the camera 101, TYPE2 as the function information, and GkeyNotExist indicating that a group key is not held as the group key information (S1102).

The camera 101 and printer 103 generate a PTK based on the A Nonce and S Nonce, and information held in advance by them (S1103, S1104). Furthermore, the camera 101 detects based on GkeyNotExist appended to the Msg2 that the printer does not hold any group key, and uses, e.g., the GTK generated at the beginning of the communication session with the camera 102. That is, the camera 101 sends, to the printer 103, Msg3 which includes the GTK (generated in, e.g., step S1004) encrypted by the PTK, and TYPE1 as the function information (S1105). Upon reception of the Msg3, the printer 103 decrypts the GTK encrypted using the PTK, and sends Msg4 as a confirmation response to the camera 101 (S1106).

If the camera 101 and printer 103 detect based on the exchanged function information that one does not have the TYPE1 function, they agree to use the GTK as a unicast key and group key, and set the GTK as a unicast key and group key (S1107, S1108).

Printer to Camera

Figure 10:
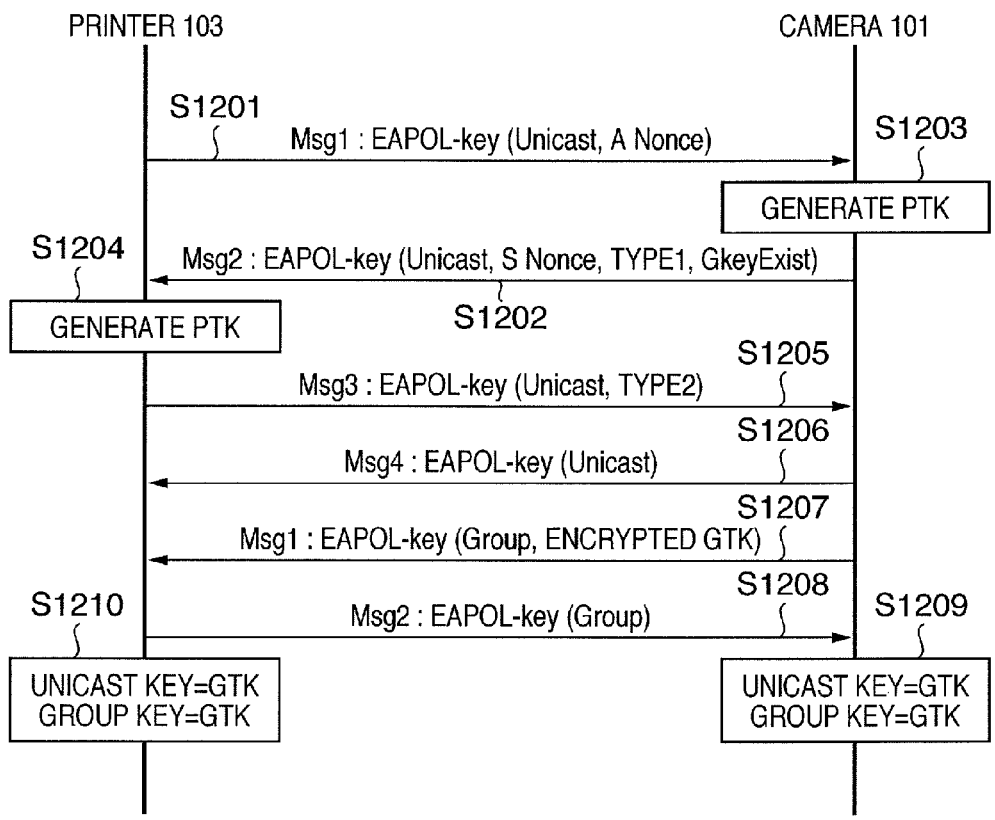

FIG. 10 is a sequence chart for explaining generation of an encryption key upon starting a communication session between the camera 101 and printer 103. Unlike in FIG. 9, the printer 103 starts the four-way handshake.

The printer 103 sends Msg1 to the camera 101 (S1201). The frame of the Msg1 includes a random number (A Nonce) generated by the printer 103. Upon reception of the Msg1, the camera 101 sends, to the printer 103, Msg2 which includes a random number (S Nonce) different from that of the printer 103, TYPE1 as the function information, and GkeyExist indicating that a group key is already held as the group key information (S1202).

The printer 103 and camera 101 generate a PTK based on the A Nonce and S Nonce, and information held in advance by them (S1203, S1204). The printer 103 detects based on GkeyExist appended to the Msg2 that the camera 101 already holds the group key, and does not generate any GTK. The printer 103 then sends Msg3 including TYPE2 as the function information to the camera 101 (S1205). Upon reception of the Msg3, the camera 101 sends Msg4 as a confirmation response to the printer 103 (S1206).

If the camera 101 confirms that a group key with the printer 103 is not set, it starts a group-key handshake to send Msg1 including the GTK encrypted using the PTK to the printer 103 (S1207). Upon reception of the Msg1, the printer 103 returns Msg2 for a confirmation response (S1208).

If the printer 103 and camera 101 detect based on the exchanged function information that one does not have the TYPE1 function, they agree to use GTK as a unicast key and group key, and set the GTK as a unicast key and group key (S1209, S1210).

The three representative sequence examples have been described. The sequence changes depending on whether a group key is not held or is already held, and which STA holds the group key. Note that those who are skilled in the art can easily imagine such changes.

Algorithm

Figure 11A:
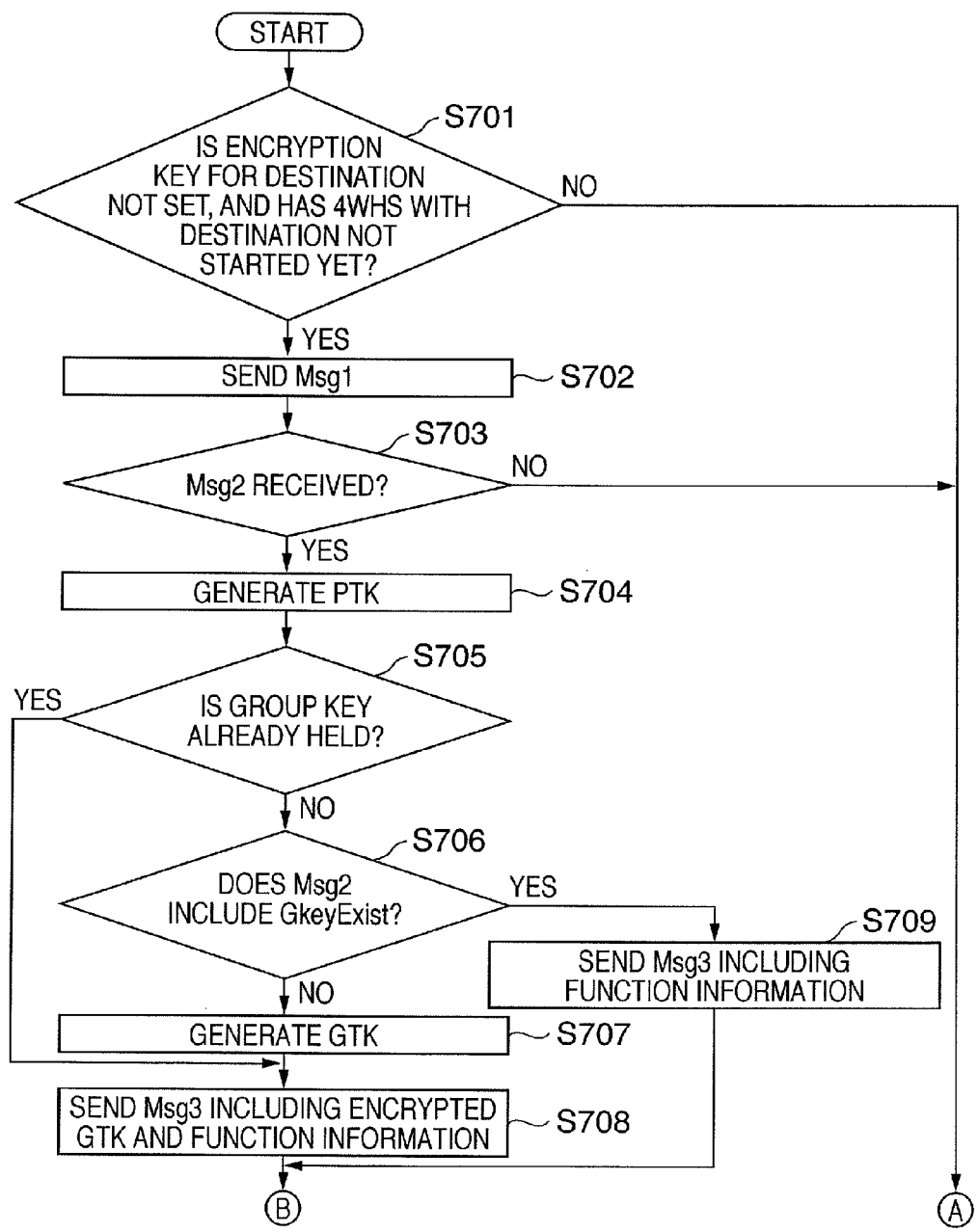
Figure 11B:
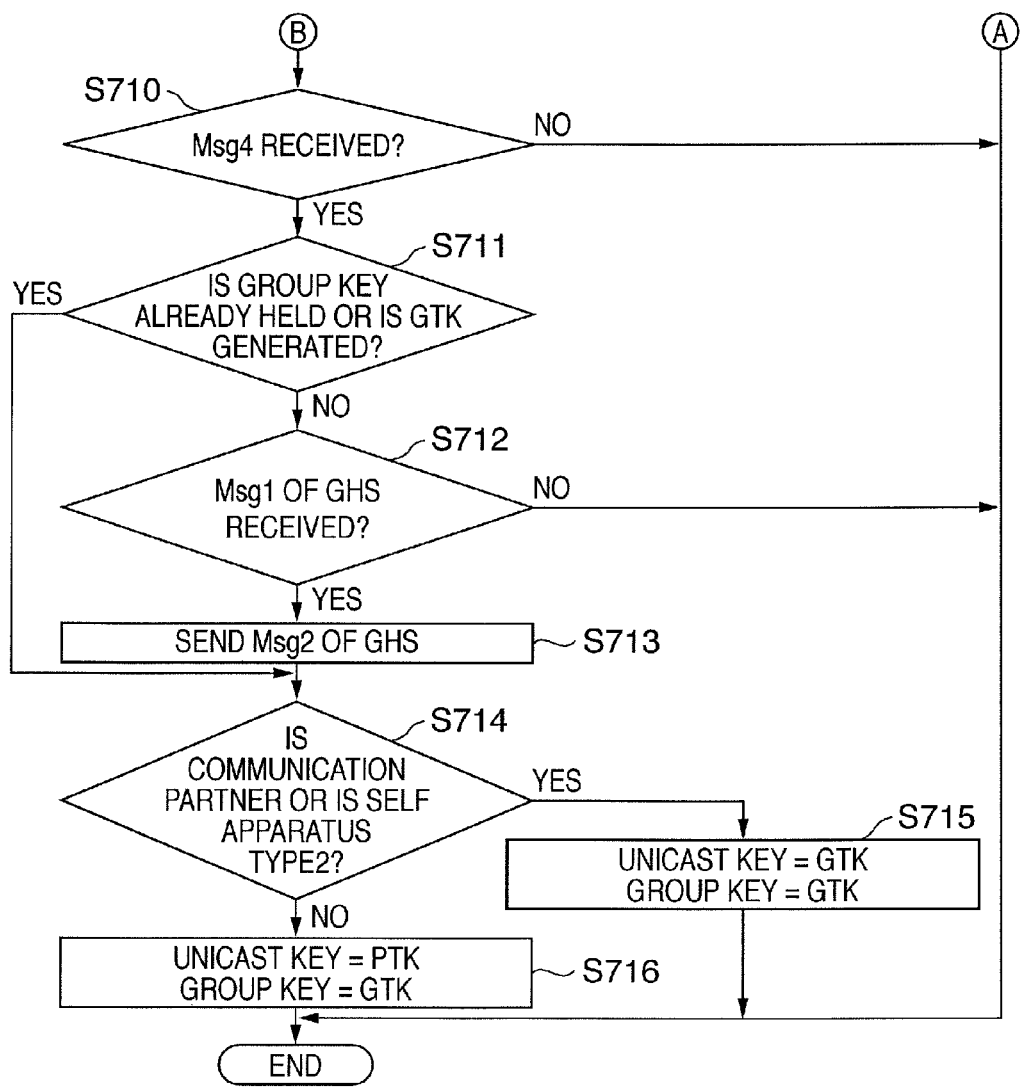
Figure 12B:
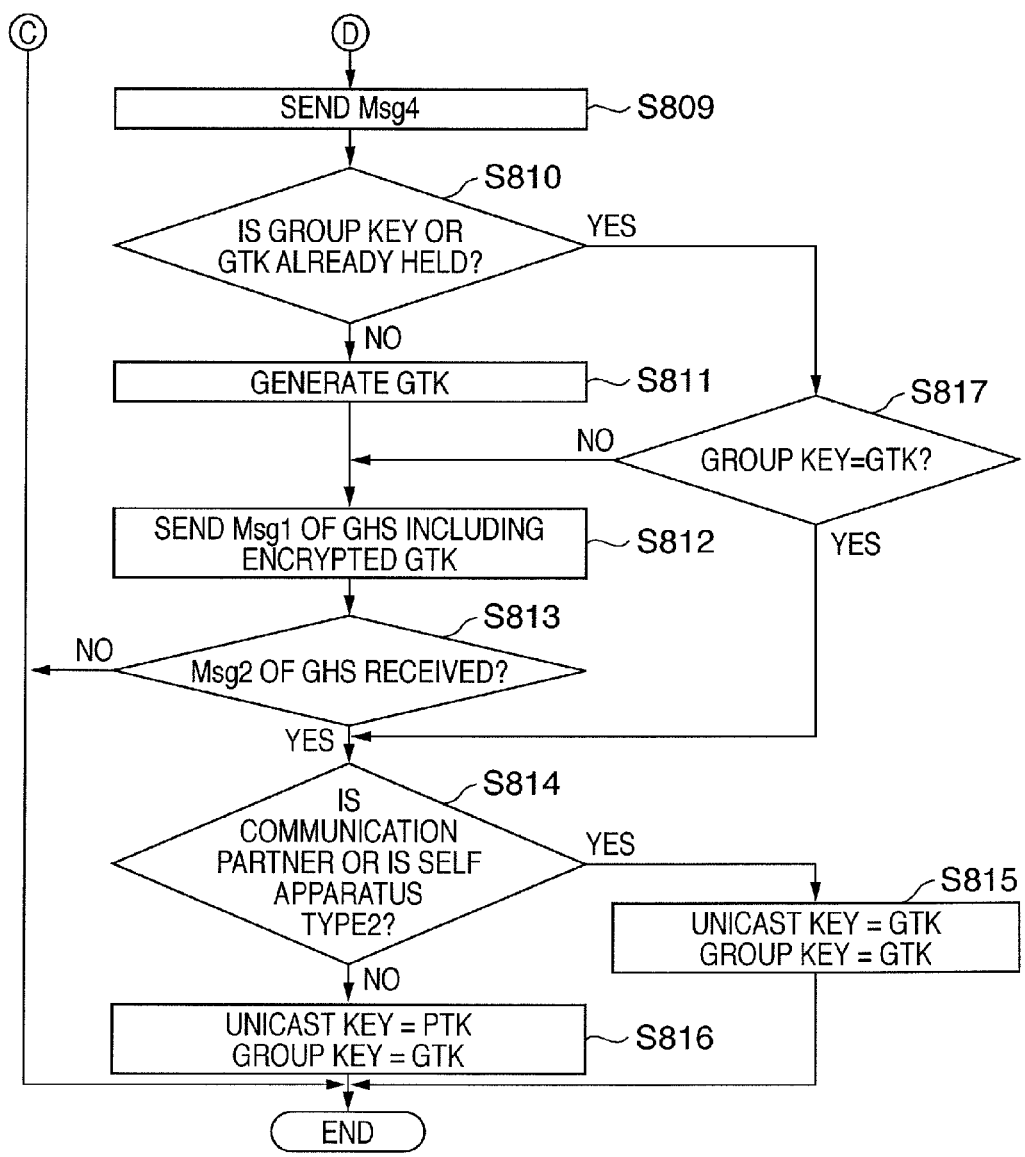

FIGS. 11A to 12B are flowcharts showing the processing for implementing the sequences shown in FIGS. 8 to 10. The CPUs 215 of the cameras 101 and 102, and the CPU 315 of the printer 103 execute the processing. Note that the algorithm changes depending on whether to send or receive the Msg1 of the four-way handshake. Therefore, FIGS. 11A and 11B show the processing upon sending the Msg1, and FIGS. 12A and 12B shows the processing upon receiving the Msg1.

Sending Msg1

A case of sending Msg1 (FIGS. 11A and 11B) will be described first.

After joining the ad-hoc network, the CPU sends data to another STA in response to an instruction from an application or the like. In this case, the CPU checks if an encryption key for that destination is not set and if the four-way handshake (described as 4WHS in FIGS. 11A to 12B) with that destination has not started yet (S701). If the encryption key is set, or if the four-way handshake has started, since the subsequent processes need not be executed, the CPU ends the processing.

If the encryption key is not set, and the four-way handshake has not started yet, the CPU sends Msg1 to the destination (S702), and checks if Msg2 is received within a predetermined period of time (S703). If the Msg2 is not received within the predetermined period of time, the CPU ends the processing; otherwise, it generates a PTK (S704).

The CPU checks if a group key is already held (S705). If the group key is held, the CPU sends Msg3 including the group key (GTK) encrypted using the PTK and the function information (S708). If the group key is not held, the CPU checks based on the group key information included in the received Msg2 if a communication partner holds a group key (S706). If the communication partner does not hold a group key either, the CPU generates a GTK (S707), and sends Msg3 including the GTK encrypted using the PTK and the function information (S708). If the communication partner already holds the group key, the CPU sends Msg3 including the function information (S709).

The CPU checks if Msg4 is received within a predetermined period of time (S710). If the Msg4 is not received within the predetermined period of time, the CPU ends processing. If the Msg4 is received within the predetermined period of time, the CPU checks if a group key is held or a GTK is generated (S711).

If the group key is held or the GTK is generated, since a unicast key and group key can be shared, the process advances to step S714. If the group key is not held or the GTK is not generated, the CPU waits for start of a group-key handshake (described as GHS in FIGS. 11A to 12B) for a predetermined period of time (S712). If Msg1 of the group-key handshake is not received within the predetermined period of time, the CPU ends the processing; otherwise, it returns Msg2 of the group-key handshake (S713). In this way, the unicast key and group key can be shared.

The CPU checks the function information of the communication partner included in the Msg2 received in step S703 and its own function information (S714). If one of the two pieces of function information indicates TYPE2, the CPU sets the GTK as a unicast key and group key (S715). If the two pieces of function information indicate TYPE1, the CPU sets the PTK as a unicast key and the GTK as a group key (S716).

Receiving Msg1

A case of receiving Msg1 will be described below.

Upon reception of the Msg1 of the four-way handshake (S801), the CPU checks if an encryption key for a STA which sent the Msg1 is not set, and the four-way handshake with that STA has not started yet (S802). If the encryption key is set, or if the four-way handshake has started, since the subsequent processes need not be executed, the CPU ends the processing.

If the encryption key is not set, and the four-way handshake has not started yet, the CPU generates a PTK (S803), and sends Msg2 including the function information and group key information to the communication partner (S804). The CPU checks if Msg3 is received within a predetermined period of time (S805). If the Msg3 is not received within the predetermined period of time, the CPU ends the processing.

If the Msg3 is received within the predetermined period of time, the CPU checks if a group key is already held by itself (S806). If the group key is already held, the CPU checks if the Msg3 includes the (encrypted) GTK (S807). If the Msg3 includes the GTK, the CPU checks if the group key (GTK) held by itself is equal to the GTK included in the Msg3 (S808). If the two GTKs are different, this four-way handshake ends in failure. If the two GTKs are equal to each other, if it is determined in step S806 that the group key is not held, or if it is determined in step S807 that the Msg3 does not include any GTK, the CPU sends Msg4 to end the four-way handshake (S809).

The CPU checks if a group key or GTK is held (S810). If the group key or GTK is not held, the CPU generates a GTK (S811), and sends Msg1 of the GHS including the encrypted GTK to the communication partner (S812). The CPU checks if Msg2 of the GHS is received within a predetermined period of time (S813). If the Msg2 of the GHS is not received within the predetermined period of time, the CPU ends the processing. If it is determined in step S810 that a group key or GTK is held, the CPU checks if the group key matches the GTK (S817) If they do not match, the CPU sends Msg1 of the GHS including the encrypted GTK using the group key as the GTK (S812).

If the Msg2 of the GHS is received within the predetermined period of time, or if the group key matches the GTK in step S817, the CPU checks the function information of the communication partner included in the Msg3 received in step S805 and its own function information (S814). If one of the two pieces of function information indicates TYPE2, the CPU sets the GTK as a unicast key and group key (S815). If the two pieces of function information indicate TYPE1, the CPU sets the PTK as a unicast key and the GTK as a group key (S816).

FIG. 7 shows a unicast key and group key set when the cameras 101 and 102 and the printer 103 start communications in the aforementioned sequences. In this way, the cameras 101 and 102 and the printer 103, which communicate with each other in the ad-hoc mode can enhance security against eavesdropping and wiretapping by using a different encryption key every time a communication session is established. Also, since existing wireless devices can be used intact, the security strength can be improved with low cost.

EXEMPLARY EMBODIMENTS

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments that can be realized by executing the program code that is read by a computer, the present invention includes a case where an OS (operating system) or the like working on the computer performs at least a part of processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs at least a part of processes in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-162812, filed Jun. 12, 2006, which is hereby incorporated by reference herein in its entirety.

What is claimed is:

1. A communication apparatus connected to a wireless network for directly communicating with another terminal, said apparatus comprising:

a determiner, arranged to determine if the communication apparatus and a terminal of a communication partner can concurrently use different encryption keys in correspondence with a plurality of communication destinations;

a unicast-key generator, arranged to generate a unicast key with the terminal of the communication partner;

a setting section, arranged to set the generated unicast key as an encryption key for a communication with the terminal of the communication partner when the determiner determines that the communication apparatus and the terminal of the communication partner can concurrently use different encryption keys in correspondence with the plurality of communication destinations and to set an encryption key uniquely set in the wireless network as an encryption key for a communication with the terminal of the communication partner when said determiner determines that at least one of the communication apparatus and the terminal of the communication partner cannot concurrently use different encryption keys in correspondence with the plurality of communication destinations, wherein the encryption key uniquely set in the wireless network is an encryption key for a communication in a terminal group.

2. An apparatus according to claim 1, wherein the encryption key set by said setting section is a session key.

3. An apparatus according to claim 1, further comprising:
a decider, arranged to decide if the communication apparatus and the terminal of the communication partner hold the encryption key for a communication in the terminal group;
a group-key generator, arranged to generate an encryption key for a communication in the terminal group when said decider decides that the communication apparatus does not hold any encryption key for a communication in the terminal group and the terminal of the communication partner does not hold any encryption key for a communication in the terminal group; and
a receiver, arranged to receive the encryption key for a communication in the terminal group from the terminal of the communication partner when said decider decides that the communication apparatus does not hold any encryption key for a communication in the terminal group and the terminal of the communication partner holds the encryption key for a communication in the terminal group.

4. A method of connecting a communication apparatus to a wireless network for directly communicating with another terminal, said method comprising the steps of:
determining if the communication apparatus and a terminal of a communication partner can concurrently use different encryption keys in correspondence with a plurality of communication destinations;
generating a unicast key with the terminal of the communication partner;
setting the generated unicast key as an encryption key for a communication with the terminal of the communication partner when the communication apparatus and the terminal of the communication partner can concurrently use different encryption keys in correspondence with the plurality of communication destinations; and
setting an encryption key uniquely set in the wireless network as an encryption key for a communication with the terminal of the communication partner when at least one of the communication apparatus and the terminal of the communication partner cannot concurrently use different encryption keys in correspondence with the plurality of communication destinations, wherein the encryption key uniquely set in the wireless network is an encryption key for a communication in a terminal group.

5. A computer-executable program stored on a non-transitory computer-readable medium comprising program code causing a computer to perform a method of connecting a communication apparatus to a wireless network for directly communicating with another terminal, said method comprising the steps of:
determining if the communication apparatus and a terminal of a communication partner can concurrently use different encryption keys in correspondence with a plurality of communication destinations;
generating a unicast key with the terminal of the communication partner;
setting the generated unicast key as an encryption key for a communication with the terminal of the communication partner when the communication apparatus and the terminal of the communication partner can concurrently use different encryption keys in correspondence with the plurality of communication destinations; and
setting an encryption key uniquely set in the wireless network as an encryption key for a communication with the terminal of the communication partner when at least one of the communication apparatus and the terminal of the communication partner cannot concurrently use different encryption keys in correspondence with the plurality of communication destinations, wherein the encryption key uniquely set in the wireless network is an encryption key for a communication in a terminal group.

6. A non-transitory computer-readable medium storing a computer-executable program causing a computer to perform a method of connecting a communication apparatus to a wireless network for directly communicating with another terminal, said method comprising the steps of:
determining if the communication apparatus and a terminal of a communication partner can concurrently use different encryption keys in correspondence with a plurality of communication destinations;
generating a unicast key with the terminal of the communication partner;
setting the generated unicast key as an encryption key for a communication with the terminal of the communication partner when the communication apparatus and the terminal of the communication partner can concurrently use different encryption keys in correspondence with the plurality of communication destinations; and
setting an encryption key uniquely set in the wireless network as an encryption key for a communication with the terminal of the communication partner when at least one of the communication apparatus and the terminal of the communication partner cannot concurrently use different encryption keys in correspondence with the plurality of communication destinations, wherein the encryption key uniquely set in the wireless network is an encryption key for a communication in a terminal group.

* * * * *